F. R. GARDNER.
Improvement in Billiard-Cue Cutters.
No. 130,912.                               Patented Aug. 27, 1872.
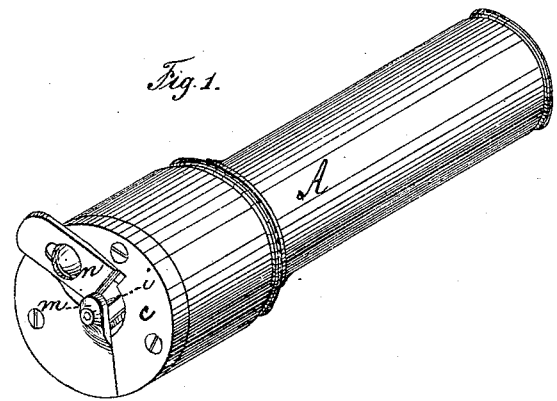
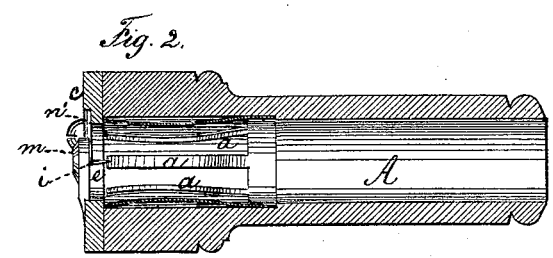
WITNESSES:                                               INVENTOR:

UNITED STATES PATENT OFFICE.

FREDERICK R. GARDNER, OF CLEVELAND, OHIO.

IMPROVEMENT IN BILLIARD-CUE CUTTERS.

Specification forming part of Letters Patent No. 130,912, dated August 27, 1872.

Specification describing a certain Improvement in Cue-Cutters, invented by FREDERICK R. GARDNER, of Cleveland, in the county of Cuyahoga and State of Ohio.

This invention relates to a device for cutting off the worn tips of billiard-cues. It consists in a wooden or metal tube, say five inches in length, with a bore large enough to readily admit the smaller end of a cue; said tube having a metal plate attached to one end, which plate has an orifice opening into the bore of the tube, and a central pin to hold the end of the cue, and a knife placed across the orifice, with the edge of which the cue comes in contact and by which the cue is cut when rotated, the tube having springs inside to direct the cue, on entering the tube, toward the aforesaid pin.

Figure 1 is a perspective view, and Fig. 2 is a longitudinal section.

A is the tube aforesaid; $a$, the springs secured inside the tube so as to guide the cue to the center; $c$, the metal plate screwed to the end of the tube; $e$, the orifice of the plate, of nearly crescent shape; $i$, the pin extending inward from a part, $m$, of the plate, which projects partly across the said orifice, the pin being at the center of the plate; and $n$, the knife which occupies a recess in the outside of the plate $c$, being screwed to the plate, and having a slanting edge, $n'$, which, near one corner, is in contact with the pin $i$ and extends quite across the orifice $e$.

The cue, being introduced within the tube A, is guided by the springs $a$ to the pin $i$, which is made to penetrate the end of the cue by drawing on the tube until the knife-edge meets the cue. Then, by turning the cue with one hand and drawing on the tube with the other, the knife is caused to trim the end of the cue very quickly and perfectly, and to any extent.

I claim as my invention—

The tube A, combined with the springs $a$, plate $c$, pin $i$, and stationary knife $n'$, in the manner and for the purpose specified.

FREDERICK R. GARDNER.

Witnesses:
EDW. P. CLARKE,
PAUL KING.